(12) United States Patent
Kimble et al.

(10) Patent No.: US 7,627,399 B2
(45) Date of Patent: *Dec. 1, 2009

(54) METHOD FOR CALCULATING AVAILABILITY FOR LINE POWER SYSTEMS

(75) Inventors: David L Kimble, Danville, CA (US); Arvind R. Mallya, Walnut Creek, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/853,622

(22) Filed: Sep. 11, 2007

(65) Prior Publication Data

US 2008/0137835 A1    Jun. 12, 2008

(51) Int. Cl.
 G05D 3/12      (2006.01)
 G06F 1/00      (2006.01)
 G01R 21/00     (2006.01)
(52) U.S. Cl. .................... 700/286; 700/22; 713/300; 702/60
(58) Field of Classification Search ............ 700/22, 700/286, 291; 709/200, 226; 713/300; 702/60–62
See application file for complete search history.

(56) References Cited

U.S. PATENT DOCUMENTS

| | | | |
|---|---|---|---|
| 5,621,654 A * | 4/1997 | Cohen et al. ............... 700/287 |
| 5,754,445 A * | 5/1998 | Jouper et al. ............... 700/295 |
| 5,798,939 A | 8/1998 | Ochoa et al. |
| 6,292,539 B1 | 9/2001 | Eichen et al. |
| 6,549,880 B1 | 4/2003 | Willoughby et al. |
| 6,650,697 B1 * | 11/2003 | Tate et al. .................. 375/222 |
| 6,839,429 B1 * | 1/2005 | Gaikwad et al. ............ 379/417 |
| 6,870,899 B2 | 3/2005 | Lu et al. |
| 6,909,941 B2 | 6/2005 | Scott et al. |
| 7,286,905 B2 * | 10/2007 | Kimble et al. .............. 700/286 |
| 2004/0158772 A1 | 8/2004 | Pan et al. |

* cited by examiner

*Primary Examiner*—Sean P Shechtman
(74) *Attorney, Agent, or Firm*—Brinks Hofer Gilson & Lione

(57) ABSTRACT

A method for calculating availability in line power systems composed of power circuit modules determines power circuit parameters associated with the power circuits, accepting input from central databases. The method calculates a required number of power circuits to complete the line power system, and calculates the total power to be delivered over the power system, based on a power calculator. The method calculates individual power circuit availabilities based on the power circuit compositions and external variables. The method then calculates an overall system availability based on the power circuit availabilities and other external variable inputs. The method may compare the calculated line power system availability with a target availability, revise the power circuit parameters, and recalculate the system availability to meet the target availability.

13 Claims, 7 Drawing Sheets

AVAILABILITY OF UPSTREAM CONVERTER (QS982A):
ONE CIRCUIT
ASSUMING CO/RT TEMPERATURE = 104F, 131F, & 158F
WIRE GAUGE=26 OSP TYPE=AERIAL MTTR=25

AVAILABILITY OF DOWNSTREAM CONVERTER (QS882A):
ONE CIRCUIT
ASSUMING SAI EQUIPMENT TEMPERATURE = 104F, 131F, & 158F
WIRE GAUGE=26 OSP TYPE=BURIED MTTR=25

Fig. 9

CIRCUIT AVAILABILITY OF LIGHTSPEED LINE POWER:
BOTH CONVERTERS & COPPER PAIRS
ASSUMING SAI EQUIPMENT TEMPERATURE = 104F, 131F, & 158F
ALLOWABLE PAIR FAILURES PER CIRCUIT <= 0
WIRE GAUGE=24 OSP TYPE=BURIED MTTR=25

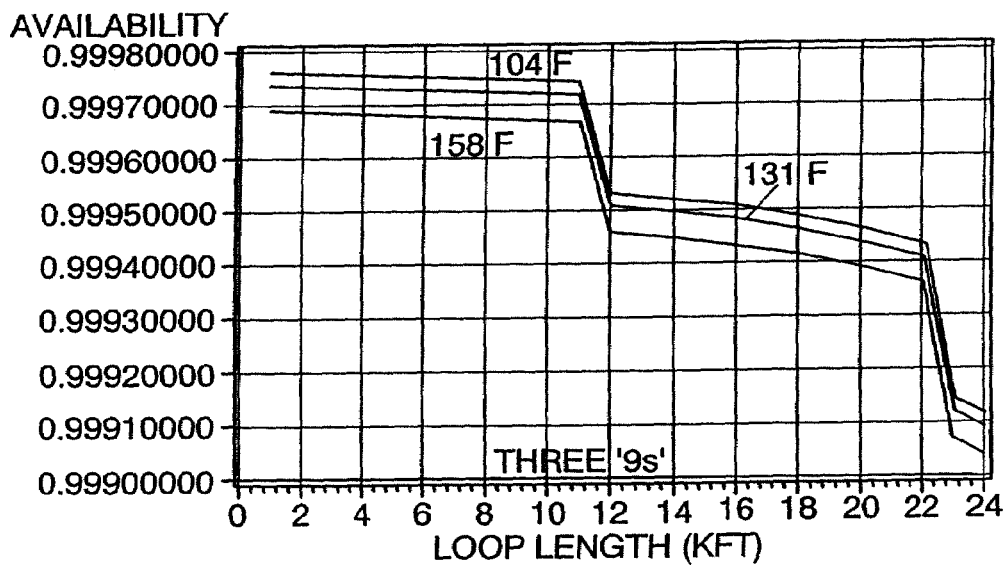

Fig. 10

LIGHTSPEED LINE POWER SYSTEM AVAILABILITY
ASSUMING SAI EQUIPMENT TEMPERATURE = 104F, 131F, & 158F
ALLOWABLE CIRCUIT FAILURES <= 1 AND CABLE CUT FIT = 100
ALLOWABLE PAIR FAILURES PER CIRCUIT <= 0
WIRE GAUGE=26 OSP TYPE=BURIED MTTR=20

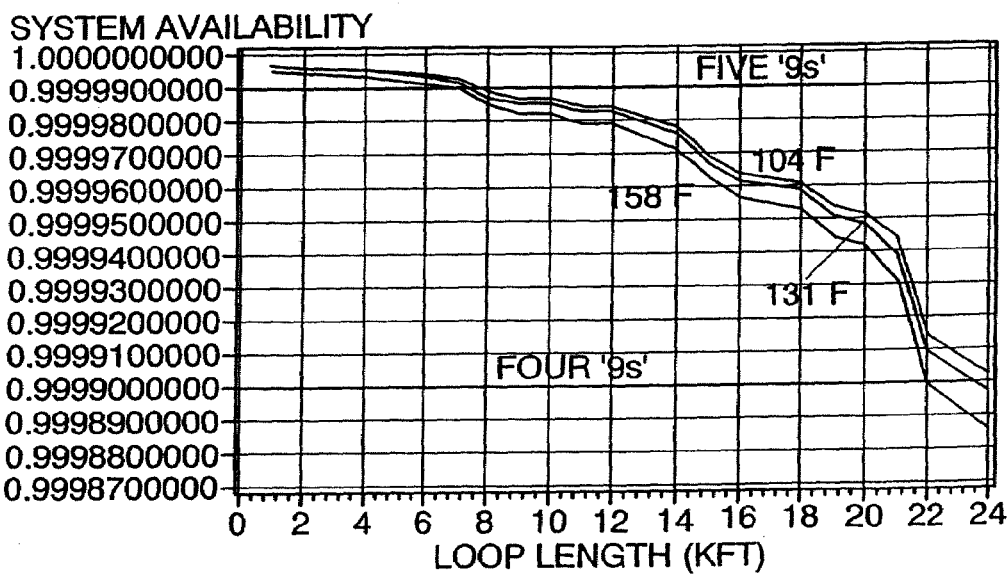

US 7,627,399 B2

METHOD FOR CALCULATING AVAILABILITY FOR LINE POWER SYSTEMS

BACKGROUND

1. Technical Field

This invention relates to line power systems. In particular, this invention relates to calculating availability for line power systems.

2. Related Art

Digital subscriber line (DSL) technology may include the digital encoding of information transmitted on a local loop, i.e., the connection between a customer's premises (home, office, etc.) and a telecommunications provider's central office serving the customer's premises. Many existing local loops in the United States and throughout the world use twisted pair copper loops, originally designed for analog service, or plain old telephone service (POTS). With digital subscriber loop technology, high speed access to the Internet, advanced telephony functions, and multimedia services may be possible over the twisted pair copper access network. Digital subscriber systems may provide data from speeds of 64 kb/second in both upstream and downstream directions to over 10 Mb/second in a single direction.

DSL providers may be required to establish availability specifications for customers. Availability may be defined as the percentage of time that services are available, or the percentage of time that provider equipment is functioning. DSL providers often provide availability measures on the order of 5 "9's" (i.e., 0.99999 availability). To achieve this level of availability, a DSL system designer may take multiple considerations into account, such as loop circuit topology and the effect of external environmental variables on system availability. Availability calculations may become difficult and time-consuming. Availability parameters for various similar designs must be computed individually.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 9 is a plot of an example line power system availability calculation for one complete circuit.

FIG. 10 is a plot of an availability calculation for a first example line power system.

DETAILED DESCRIPTION

Figure 1:
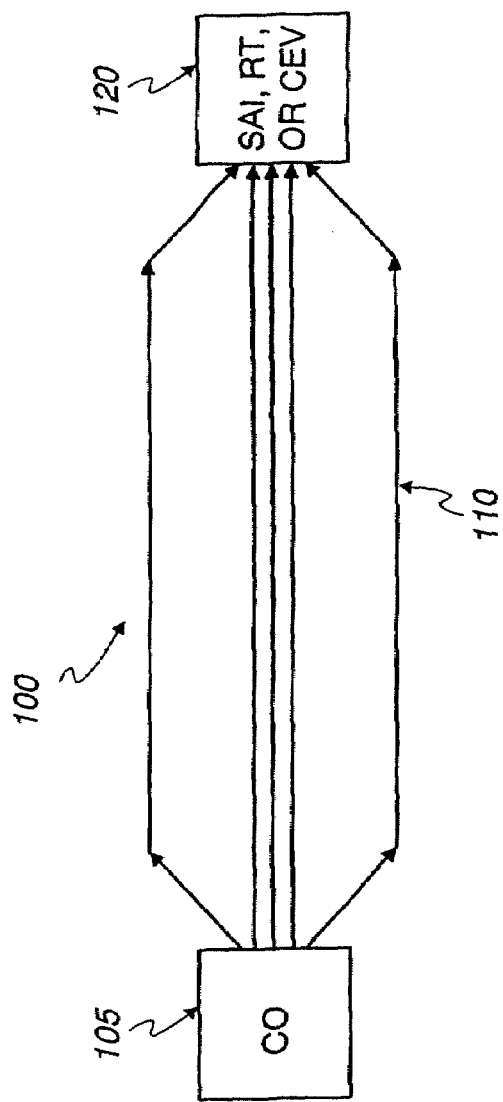
FIG. 1 is a block diagram of a line power system.

A method for calculating availability in line power systems composed of power circuit modules determines power circuit pals associated with the power circuits, accepting input from a central database. The method calculates a required number of power circuits to complete the line power system, and calculates a power factor to be delivered over the power system, based on a power calculator. The method calculates individual power circuit availabilities based on the power circuit compositions and external variables. The method then calculates an overall system availability based on the power circuit availabilities and other external variable inputs. The method may compare the calculated line power system availability with a target availability, revise the power circuit parameters, and recalculate the system availability to meet the target availability.

A method for calculating the availability in a line power system calculates the availability parameter for various central office-serving area interface (CO-SAI) based Line power systems and SAI based local power designs quickly and efficiently. Availability is defined as the proportion of time a system is available to work, or the proportion of time that service is available. For complex line systems, the availability calculation process may be difficult. The method may use probability theory applied to the specific designs. The designs may be graphically compared immediately for the next level of improvement to the design. Actual loop lengths, prevailing ambient temperature, gauge mix, loop type and remote terminal origination are all possible input variables into the method. The method uses data imported from other databases to perform the computation. The method may utilize the availability models of ADTRAN, ALCATEL and TYCO power components and may add more redundancy to each either at the line (pair) level or the circuit level to calculate the resulting availability. The ALCATEL model provides the number of circuits and pairs per circuit based on the loop length and number of customers at the SAI to ensure the electric current does not cause the copper wire to heat up above a specified temperature. The ADTRAN and TYCO power calculators provide similar outputs for determining the number of circuits and pairs to complete a line power system.

The copper pair availability may be derived, using a power calculator for calculating pairs and circuits required with wire gauge, plant type (aerial, buried, or underground), and loop length. The power calculator may be based on an ALCATEL calculator, or may be based on the power calculator described in U.S. patent application Ser. No. 11/229,563, "Method for Configuring Power Loops between Central Office and Subscriber Access Interface" filed Sep. 19, 2005, which is incorporated herein by reference. The ALCATEL power calculator is an industry standard calculator that determines the required number of loops required to complete a given line power system, as well as providing a calculation of the total power delivered to the line power system for a given number of circuits and lines per circuit. The power calculator may output the number of copper pairs per circuit (feeder circuits) and the total number of copper pairs required. The number of circuits (feeders) is the quotient of these two volumes. The total pairs required, number of circuits required and the number of pairs per circuit (feed) all may be functions of loop length. The number of pairs and number per feed both may increase monotonically with loop length. The total copper circuit availability may decrease with loop length as more loops are added. The number of circuits may not be monotonic and consequently, system availability may rise each time another pair per feed is required. The number of converters—both upstream and downstream—may fall each time an additional pair per loop is required, affecting the availability accordingly. The circuit availability may monotonically decrease, but the system availability may not monotonically decrease, and may rise or flatten as numbers of pair points are added.

FIG. 1 illustrates a line power system 100 that may include a central power circuit source, or a central office (CO) 105, a remote power circuit delivery node 120, such as a serving area interface (SAI), a location that may receive line power from the CO such as a remote terminal (RT), or a unit that may include an RT and a controlled space such as a controlled environment vault (CEV), and at least one interconnecting circuit system 110, such as a number of twisted pair copper wires or other system modules. The CO 105 may provide outputs to the line power system such as electrical power or telecommunication signals, or a combination of both. Examples of telecommunication signals include standard plain-old-telephone service (POTS) and/or very high bit rate digital subscriber line (VDSL)/asymmetric digital subscriber line (ADSL) services. The SAI 120 may be a remote active or passive device that may require a source of power. The SAI 120 may be powered by a commercial power source such as an electricity grid utility source, or the SAI 120 may be powered from the CO 105 with electricity delivered over the interconnecting circuit system 110, such as through twisted pair copper wires. Examples of the interconnecting circuit system 110 include F1 wire loops extending from the CO 105 to the SAI 120 in a VDSL line power delivery architecture. The CO 105 may include an alternating current (AC) central power source such as a primary or back-up generator, direct current (DC) back-up batteries, or the CO 105 may receive commercial electricity from the electricity grid, which may then be conditioned for delivery to the SAI 120 through the interconnecting circuit system 110.

The system works with "M−1" circuit systems, where M is the number of feeds connecting the CO 105 and SAI 120, but fails when two or more circuits fail simultaneously during the same time interval. This may occur when two or more circuits are "not available." All F1 line pairs may fail because of a cable cut, or destruction of all the circuit systems. This special case may be modeled as a dependent event. Another dependent event may be the operating temperatures for components in the same environment, like an SAI, CO or CEV. The increased failure rates decrease the availability of all components operating in the same environment.

Figure 2:
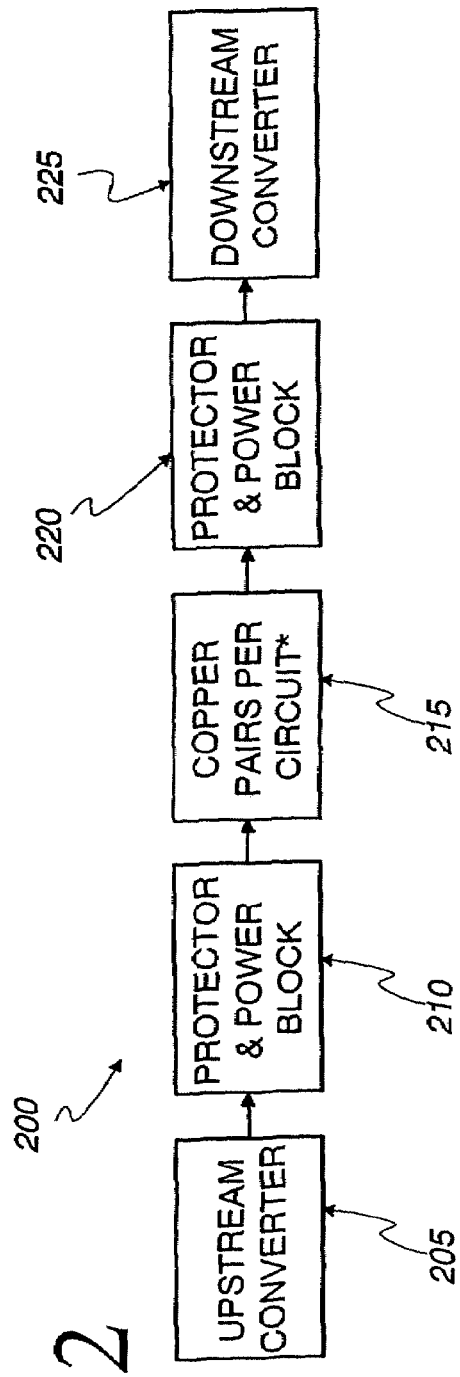
FIG. 2 is a block diagram of an example line power system.

FIG. 2 illustrates another line power system 200 depicting the interconnecting circuit system 110 with further detail. The line power system 200 may include a unit for converting data, power, or a combination thereof at the CO 105, such as an upstream converter 205, a unit at the CO 105 for protecting the interconnecting circuit system 110, such as a CO protector and power block 210, a number of twisted pair copper wire lines 215, a unit at the SAI 120 side for protecting the SAI 120, such as an SAI protector and power block 220, and a unit at the SAI for down-converting power and/or data, such as an SAI downstream converter 225. The copper lines 215 may be arranged in a number of configurations. The copper lines 215 may be configured so that there is one feeder arranged between the CO 105 and the SAI 120, where a feeder may be defined as an interconnecting circuit coupling the CO 105 and the SAI 120. A circuit may comprise one or more pairs of wires in a loop. Alternatively, there may be more than one feeder arranged between the CO 105 and the SAI 120. Additional feeders provide back-up redundancy if there are failures in the interconnecting circuit systems 110. A feeder may comprise one or more twisted copper line pairs. The required number of copper line pairs per feeder may be determined by a circuit power calculator, such as an ALCATEL power calculator or the power calculator described in U.S. patent application Ser. No. 11/229,563, "Method for Configuring Power Loops between Central Office and Subscriber Access Interface." The feeder may have more than the minimum required number of copper line pairs determined by the power calculator. The additional line pairs may provide additional line power system availability by requiring two or more line pairs to fail for an interconnecting circuit system 110 to fail completely. Additional feeders also may provide additional line power system availability by requiring more than two interconnecting circuits 110 to fail for the entire circuit system 110 to fail completely.

The components in FIG. 2 may be in series, so if one link or component fails, then the circuit also may fail. If an alarm circuit (not shown) fails and the alarm fails to notify the emergency maintenance system (EMS) system about a down circuit, then the availability may be lowered. This continuity may be modeled into the probabilities.

Figure 3:
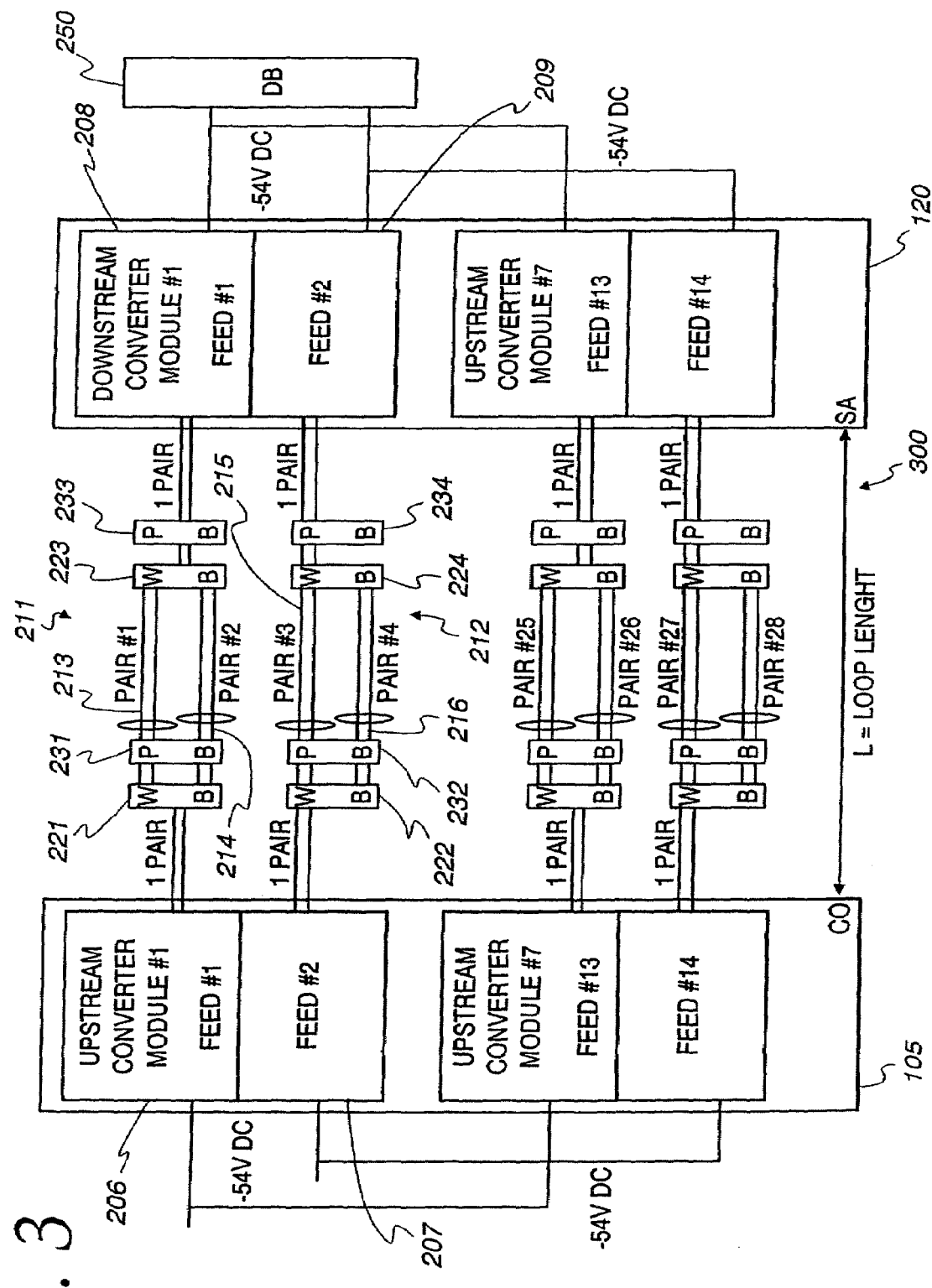
FIG. 3 is a block diagram of a second example line power system.

FIG. 3 illustrates an example line power system 300 that includes a CO 105, SAI 120, and an interconnecting circuit system 210. The CO 105 and the SAI 120 are separated in this example 300 by a loop length L. In this system, the interconnecting circuit system 210 comprises two feeder circuits (211 and 212), and each feeder circuit (211 and 212) comprises one copper pair line (213, 214, 215, and 216). The circuit system 210 may further include upstream power protection fuses (221 and 222), downstream power protection fuses (223 and 224), upstream power blocks (231 and 232), and downstream power blocks (233 and 234). The power blocks 233 and 234 may include fuse boxes or fuse circuits. In this line power system 300, the CO 105 includes two urea converter modules (206 and 207), which may provide power and/or digital subscriber link services to the line power system 300 and the SAI 120 through the feed circuits (211 and 212). The SAI 120 includes two downstream converter modules (208 and 209) which receive inputs from the feeder circuits (211 and 212). The CO upstream converter modules (206 and 207) may be Tyco CPS3200U modules, for example. The SAI downstream converter modules (208 and 209) may be Tyco CPS2500D modules, for example. The SAI 120 may supply a communications device 250, with power, digital subscriber link services, or a combination thereof. In this system, the SAI 120 supplies the communications device 250 with 54V power and VDSL service. The communications device 250 may be an Alcatel 7330 device, for example.

Figure 4:
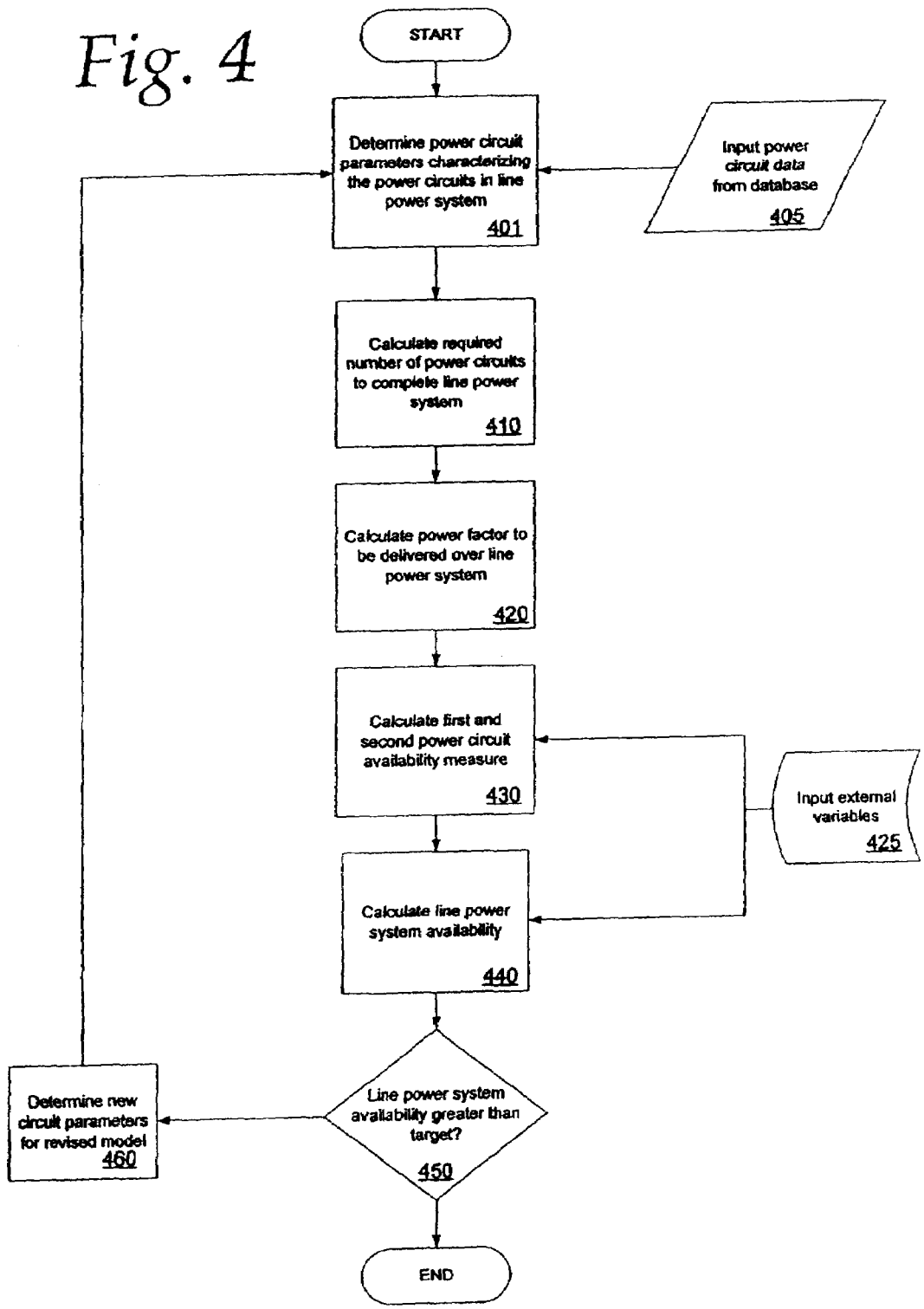
FIG. 4 is a flow diagram of a process to calculate availability of a line power system.

FIG. 4 illustrates a process that calculates availability for a line power system. The line power system includes power circuits which deliver power through the line power system. The power circuits also may serve as modules or sub-units of the line power system when calculating parameters related to the line power system. Examples of power circuits in the line power system include the modules illustrated in FIGS. 1-3, including CO 105 modules, SAI 120 modules, interconnecting circuits 110, upstream converters 205, upstream power protector and power blocks 210, copper wire pairs 215, downstream power protector and power blocks 220, and downstream converters 225. The method determines, at act 401, a number of power circuit parameters characterizing each of the power circuits. The power circuit parameters may include the number and type of components in the power circuits, the locations of the power circuits, the loop length, wire type, wire gauge, and other dimensions of the wires interconnecting the power circuits, wire, component, and circuit properties such as resistance, impedance, inductance, and capacitance values, manufacturer information, and performance and repair figures of merit. The data may be input from a database comprising records of these circuit parameters, at act 405. The circuit parameters may be input from a predetermined database, such as an Automated Records and Engineering System (ARES), Loop Facilities Assignment and Control System (LFACS), or Loop Engineering Information System (LEIS) database, or may be input dynamically in real-time. The LEIS database is a database of engineering data, part of which is loaded from the LFACS database. It provides the engineers with daily planning, design operations, utilization and inventory data. This is a Telcordia developed system. The LFACS database maintains an inventory of Outside Plant (OSP) facilities and their relationships with customer addresses. It assigns service orders, supports plant rearrangement and helps with repair/maintenance. This is a Telcordia developed system. The loop lengths may be related to the loop gauge, and may typically be of 24 or 26 gauge copper wire.

The method calculates a required number of power circuits to complete the line power system, at act 410. The method also calculates a total power to be delivered over the line power system, at act 420. The required number of power circuits and the power to be delivered over the line power system are calculated from a circuit power calculator. The circuit power calculator may process the circuit parameters determined at act 401 to calculate a minimum number of power circuits, such as copper wire pairs, required to transmit a given power load through the line power system. In this system, the power calculator may comprise an ALCATEL calculator or the power calculator described in U.S. patent application Ser. No. 11/229,563, "Method for Configuring Power Loops between Central Office and Subscriber Access Interface" for calculating pairs and circuits required with wire gauge, plant type (aerial, buried, or underground), and loop length. The power calculator may output the number of copper pairs per circuit (feeder) and total number of copper pairs required. The number of circuits (feeders) may be the quotient of these two values. The total pairs required, number of circuits required and the number of pairs per circuit (feeder) may be all functions of loop length. The number of pairs and number per feeder both may increase monotonically with loop length.

The method calculates a first power circuit availability measure and a second power circuit availability measure based on the power circuit parameters determined at act 401 and a plurality of external variables, at act 430. The method may take into account all the failure modes and the failure rates of the CO based DC-DC converters, the outside plant cable and the SAI based DC-DC converters. The method, at act 430, may apply a thermal failure acceleration factor to arrive at the overall system downtime for the first power circuit, which may comprise a CO 105. The same analysis is applied for the SAI based local power option 120, where the commercial grid outages (from Power Utilities Commission/Illinois Commerce Commission (PUC/ICC) databases), rectifier and battery failure rates are used to calculate the downtime. In one embodiment, a thermal acceleration factor (from national weather databases, for example) is applied for the components in the SAI 120 for arriving at the overall power system downtime.

The external variables may comprise variables such as the locations of remote power circuit modules, such as an SAI 120; environmental variables, such as the temperature of the power circuit systems, the ambient air temperature external to the power circuit systems; ambient atmospheric readings such as barometric pressure, humidity, dew point, wind velocities, solar angle (which may include the latitude of the geographical location of the circuits), ground albedo, and solar exposure readings; and failure and/or repair statistics, such as the failure-in-time (FIT), mean-time-to-failure (MTTR), or mean-time-to-repair (MTTR) of a particular power circuit. The failure and/or repair statistics may include Weibull and exponential distributions as well as other statistical descriptions of the failure and/or repair rates. The MTTR may be a discretionary repair commitment. The shorter the MTTR is, the more repair employees may be required, and the greater the cost of maintenance. Other external variables which may affect the performance of a line power system may also be incorporated into the model. The external variables may be input from a predetermined database, at act 425, or may be input dynamically in real-time as readings occur.

The method then calculates a line power system availability based on the first power circuit availability, the second power circuit availability, and a number of external variables, at act 440. For the line power system depicted in FIG. 3, with one extra feeder and the minimum number of copper pair lines per feeder, the line power system availability may be calculated from:

$$Av\_system = \left( \frac{Av\_circuit^M + M * Av\_circuit^{M-1} *}{(1 - Av\_circuit)} \right) *$$
$$Av\_no\_cable\_cut$$

where:

$$Av\_circuit = Av\_Upstream\_Converter *$$
$$Av\_Copper\_Pairs\_Per\_Feed *$$
$$Av\_Downstream\_Converter$$

$$Av\_Upstream\_Converter = \frac{\frac{1}{MTTR}}{\frac{1}{MTTR} + \text{failure rate upstream}}$$
$$= \frac{\mu_{USC}}{\mu_{USC} + \lambda_{USC}}$$

$$Av\_Downstream\_Converter = \frac{\frac{1}{MTTR}}{\frac{1}{MTTR} + \text{failure rate downstream}}$$
$$= \frac{\mu_{DSC}}{\mu_{DSC} + \lambda_{DSC}}$$

Where Av_system is the line power system availability, Av_circuit is the availability of a power circuit within the line power system, Av_Upstream_Converter and Av_Downstream_Converter are the availability measures for the upstream and downstream converters (205 and 225 respectively), Av_Copper_Pairs_Per_Feed is the availability of a copper pair in a feeder circuit, Av_no_cable_cut is the probability (availability) of no disruption or destruction of the interconnecting circuit between the CO 105 and SAI 120, $\mu_{USC}$ is the repair rate for the upstream converter 205, and $\lambda_{USC}$ is the failure rate (FITS) for the upstream converter. $\mu_{DSC}$ is the repair rate for the downstream converter 225, $\lambda_{DSC}$ is the failure rate (FITS) of the downstream converter and M is the number of feeder circuits between the CO 105 and SAI 120.

In some systems, one copper pair per feeder is provided, i.e., no extra copper pairs are provided in the circuit. In those systems, if one copper pair fails, then the feeder circuit fails. This is incorporated into the method as:

$$\text{Av\_Copper\_Pairs\_Per\_Feed} = (\text{Av\_Copper\_Pairs})^{\text{Pairs\_per\_feed}}$$

If all circuits are available, then the system is available. The model also may imply that if one circuit fails (when M>1), then the system is still available for service. Only when all M feed circuits fail will the system be unavailable. Alternatively, the method may calculate the line power system availability using a different relation if there are two extra feeders per system, using:

$$\text{Av\_system} = \begin{pmatrix} \text{Av\_circuit}^M + M * \text{Av\_circuit}^{M-1} * \\ (1 - \text{Av\_circuit}) + M * \dfrac{M-1}{2} * \\ \text{Av\_circuit}^{M-2} * (1 - \text{Av\_circuit})^2 \end{pmatrix} * \text{Av\_no\_cable\_cut}$$

where the parameters have the same definitions as above. In other systems, where one extra pair of copper wire is provided for a feed circuit, the failure of two copper wire pairs may result in the failure of the feed circuit. In these systems, this failure mode is incorporated into the method as:

$$\text{Av\_Copper\_Pairs\_Per\_Feed} = (\text{Av\_Copper\_Pairs})^{\text{Pairs\_per\_feed}} +$$
$$(\text{Pairs\_per\_feed}) *$$
$$(\text{Av\_Copper\_Pairs})^{\text{Pairs\_per\_feed}-1} *$$
$$(1 - \text{Av\_Copper\_Pairs})$$

The method may compare a predetermined availability metric with the calculated line power system availability, at act 450. The predetermined availability metric may comprise a value selected by the system designer as the minimum acceptable system availability, or a customer required availability target. The predetermined availability metric may be set at run-time, or may be selected in real-time as external variables change. If the calculated line power system availability is greater than the predetermined availability metric, then the method terminates. If the calculated line power system availability is less than the predetermined availability metric, then the method may determine a new number of power circuit parameters, at act 460, and calculate a new line power availability according to the method described above.

Figure 5:
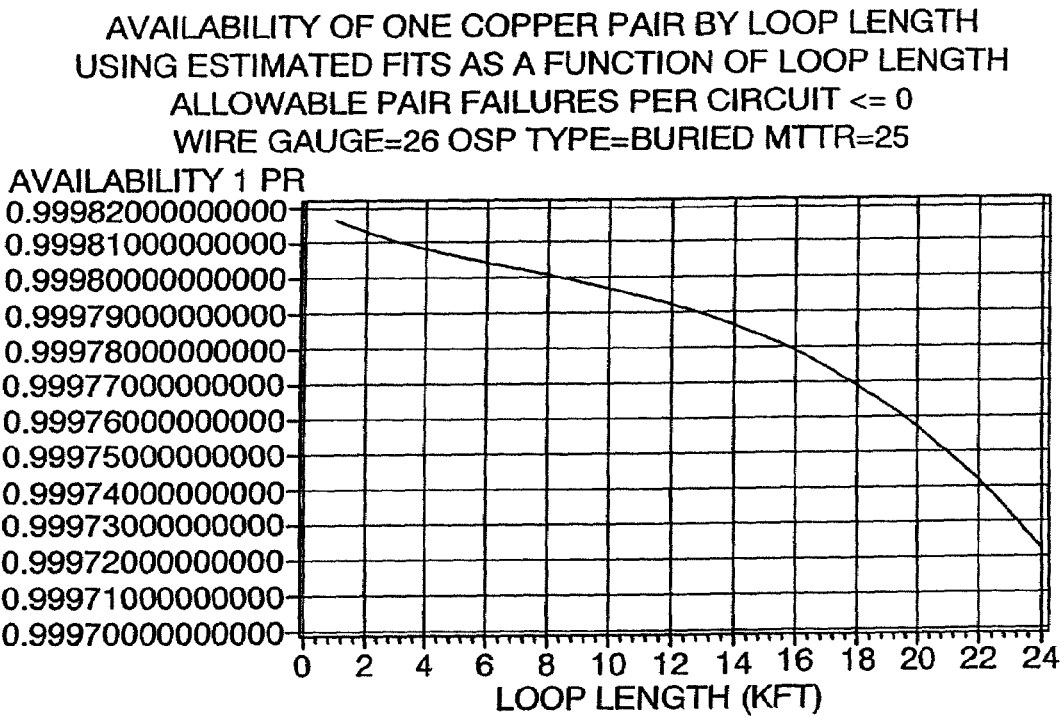
FIG. 5 is a plot of an example line power system availability calculation for aerial and buried copper line pairs as a function of loop length.

FIG. 5 illustrates a plot of a resulting example line power system availability calculation for aerial and buried copper line pairs as a function of loop length. The copper wire may be 26 gauge, with one pair per feeder used in the availability model. This example system assumes the MTTR is equal to 25 hours. As can be seen in FIG. 5, the copper pair availability falls monotonically as loop length increases. The availability shown for 26 gauge, aerial cable and an MTTR=25 is of the order of high "three 9s" (between 0.9997 and 0.9998).

Figure 6:
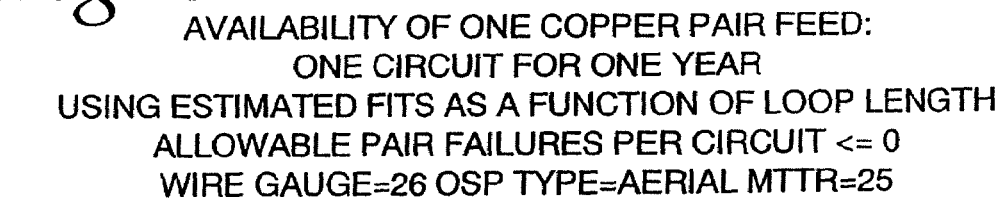
FIG. 6 is a plot of an example line power system availability calculation for aerial and buried copper line pairs as a function of loop length for a line power system having one feed circuit.

FIG. 6 illustrates a plot of a resulting example line power system availability calculation for aerial and buried copper line pairs as a function of loop length for an example line power system having only one feeder circuit. This example assumes the MTTR is equal to 25 hours and there are no allowable pair failures per feeder. As can be seen in FIG. 6, the copper pair availability falls monotonically as loop length increases, but the function steps down with the pairs per feeder jump of the power calculator determined model. Also, the availability shown for 26 gauge, aerial cable and an MTTR=25 is in the "three 9s" order (between 0.9991 and 0.9998).

Figure 7:
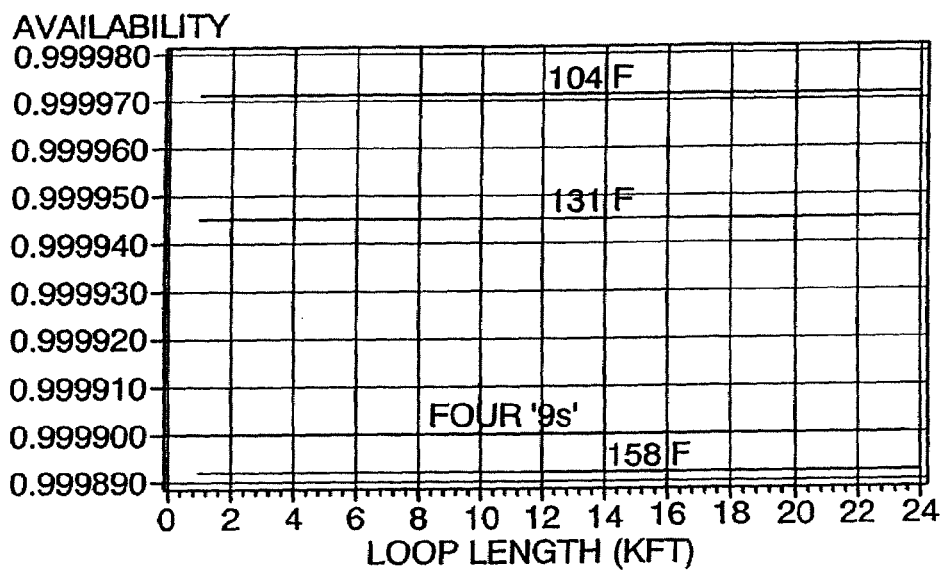
FIG. 7 is a plot of an example upstream converter availability calculation.

FIG. 7 illustrates a plot of a resulting example upstream converter availability calculation for aerial copper line pairs of 26 gauge. This example assumes the MTTR is equal to 25 hours. The three plot lines represent the operating temperatures plus ambient temperatures. The most available function represents 104 F. The middle line represents availability at 131 F, and bottom line represents availability at 158 F. As can be seen in FIG. 7, individual upstream converter availability may not be a function of loop length, but the number of converters required is. Also, the availability shown for MTTR=25 is less than high "Four 9s" to nearly "Five 9s" (i.e., between 0.99989 and 0.99997).

Figure 8:
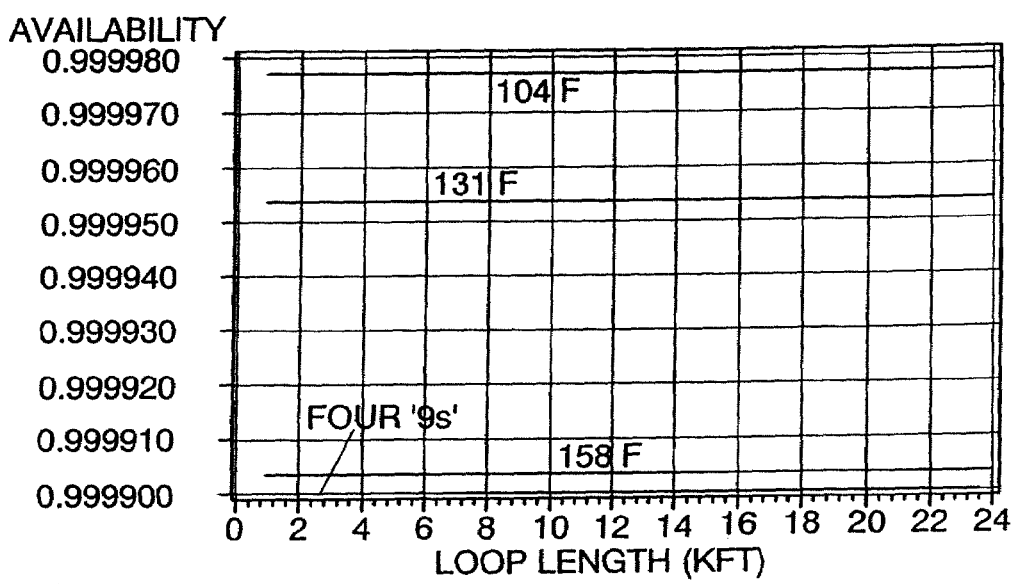
FIG. 8 is a plot of an example downstream converter availability calculation.

FIG. 8 illustrates a plot of a resulting example downstream converter availability calculation for buried copper line pairs of 26 gauge. This example assumes the MTTR is equal to 25 hours. The three plot lines represent the operating temperatures plus ambient temperatures. The most available function line represents 104 F. The middle line represents availability at 131 F, and bottom line represents the availability at 158 F. As can be seen in FIG. 8, an individual downstream converter's availability may not be a function of loop length, but the number of converters required is. Also, the availability shown for MTTR=25 is less than low "four 9s" to nearly "five 9s" (i.e., between 0.9999 and 0.99998). For pairs of 26 gauge, aerial and buried, the downstream converter circuit component availability is above the "five 9s" for MTTR=5 hours and temperatures less than 131 F. This may imply extreme temperature environments may stiff allow system availability above the overall availability target. For pairs of 26 gauge copper line pairs, aerial and buried, the downstream converter circuit component availability is above the "five 9s" for MTTR=10 and 15 hours and temperatures less than 131 F. This may imply moderate summer temperature environments may still allow system availability above the overall availability targets.

FIG. 9 illustrates a plot of a resulting example line power system availability calculation for one complete circuit for buried, 26 gauge copper line pairs. This example assumes the MTTR is equal to 25 hours. The three plot lines represent the operating plus ambient temperatures. The most available function line represents 104 F. The middle line represents availability at 131 F, and the bottom line represents the availability at 158 F. As can be seen from FIG. 9, the circuit availability falls monotonically with loop length, but the function steps down as pairs per feeder are added based on the ALCATEL calculator model. Also, the availability shown for 26 gauge, aerial cable and MTTR=25 is from "three 9s" to high "three 9s" (0.999 to 0.9997). Loop length may affect circuit availability more greatly than does temperature in this configuration.

FIG. 10 illustrates a plot of a resulting example line power system availability calculation for buried, 26 gauge copper line pairs with no pair per feeder allowed to fail without the circuit failing. This example assumes the MTTR is equal to 20 hours. The three plot lines represent the operating temperatures plus ambient temperatures. The most available function line represents 104 F. The middle line represents availability at 131 F, and the bottom line represents availability at 158 F. As can be seen from FIG. 10, the circuit availability falls monotonically as loop length is increased, but the function very slightly steps down as pairs per feed are added based on the power calculator model. The availability shown for 26 gauge, aerial cable and MTTR=25 is of the order of high "three 9s" to greater than "five 9s" (0.9998 to 0.999995). Loop length may have a greater effect on availability than temperature does. The line power system availability is above "five 9s" level only for loop length~7 kft and less than 131 F or 4 kft and temperatures less than 158 F. Otherwise, the availability is less than "five 9s."

Figure 11:
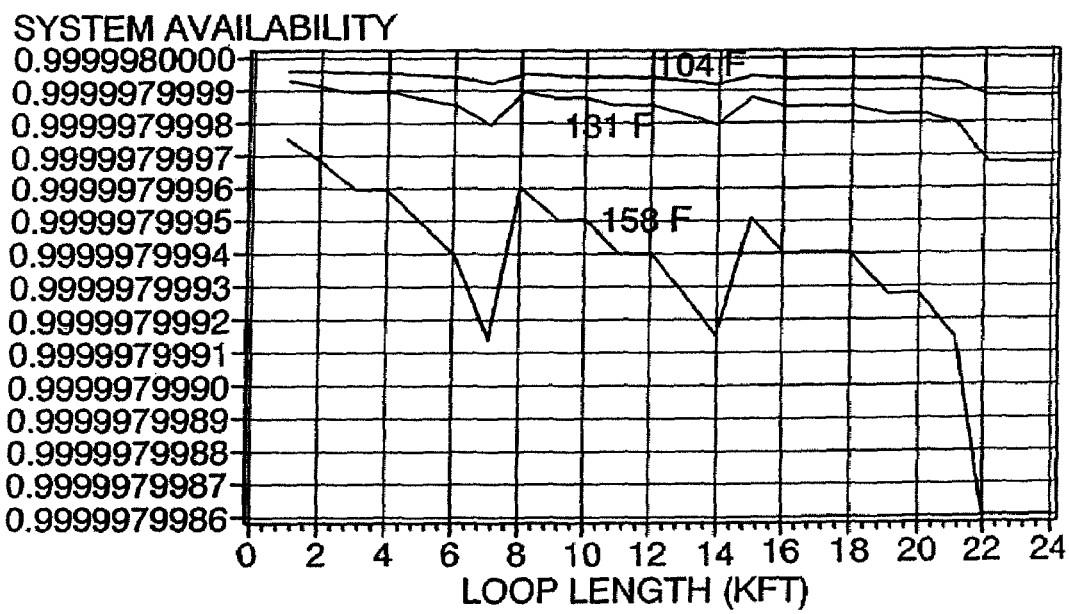
FIG. 11 is plot of an availability calculation for a second example line power system.

FIG. 11 illustrates a plot of a resulting example line power system availability calculation for buried, 26 gauge copper line pairs with one pair per feeder allowed to fail without the circuit failing and two circuits failing without the system failing. This example assumes the MTTR is equal to 20 hours. The three plot lines represent the operating temperatures plus ambient temperatures. The most available function line represents 104 F. The middle line represents availability at 131 F, and the bottom line represents the availability at 158 F. As can be seen from FIG. 11, the circuit availability may not fall monotonically with loop length, but the function steps down and up as the number of circuits is modified based on the power calculator model. The availability shown for 26 gauge, aerial cable and MTTR=20 is of the order of high "five 9s" (0.999997 to 0.999998). The temperature may have a greater effect on availability than does loop length. The system availability is above the "five 9s" level even with the MTTR=20 hours for all but the most extreme temperature (158 F) and the longest loop lengths shown (>24 kft).

Calculations from the model in the application may imply that loop length affects line power availability more than does temperature difference, within the scale range of both variables in the current design, but with one more pair per feeder added and allowed to fail. Then the availability increases greatly. Using the ALCATEL calculator, copper pairs per circuit (ranging from 1 to 7 pairs) have availability ranges from 0.9998 at 1 kft to 0.9992 at 24 kft (assuming MTTR=25). The availability of a single copper loop is less than "five 9s" even at the shortest loop lengths. Adding one additional pair per feeder to the ALCATEL calculator, copper loops combined (1 to 7) pairs per circuit have availability ranges from 0.99999998 at 1 kft to 0.99999952 at 24 kft (assuming MTTR=25). For one circuit, the upstream converter availability ranges from mid "five 9s" at 5 hours MTTR and 104 F to high "three 9s" at 25 hours MTTR and 158 F. For one circuit, the upstream converter availability ranges from mid "five 9s" at 5 hours MTTR and 104 F to "four 9s" at 25 hours MTTR and 158 F.

Using the ALCATEL calculator to determine the number of pairs per feeder for both upstream and downstream converters, the single circuit availability ranges from high "three 9s" at 1 kft and 104 F to "three 9s" at 24 kft and 158 F. These figures assume an MTTR=20 hours and 26 gauge, buried copper pair lines. Adding one additional pair per feed to the ALCATEL calculator—determined number of pairs per feeder for both the upstream and downstream converters creates circuit availability ranges from mid "five 9s" at 1 kft and 104 F to high "three 9s" at 24 kft and 158 F. These figures assume an MTTR=20 hours and 26 gauge, buried copper pair lines. The availability differences are due to temperature and not loop length effects.

In some systems, the upstream converter may be located in a CO 105, CEV, or hut, but not in an RT. For the line power system as a whole, using the power calculator-calculated number of pairs per feeder for both the upstream and downstream converters, the single feed circuit availability ranges from mid "five 9s" at 1 kft and 104 F to high "three 9s" at 24 kft and 158 F. These figures assume an MTTR=20 hours and the 26 gauge, buried copper line pairs. In systems where the upstream converter is located in an RT, the availability decreases in the $5^{th}$ and $6^{th}$ decimal places.

Adding one additional pair per feeder to the power calculator-calculated number of pairs per feeder for both the upstream and downstream converters may result in availability ranges from mid "six 9s" at 1 kft and 104 F (with MTTR=5 hours) to mid "five 9s" at 24 kft and 158 F (with MTTR=25 hours). The availability differences are due to temperature and not loop length effects. In systems where the upstream converter is placed in an RT, the availability decreases in the $5^{th}$ and $6^{th}$ decimal places.

In some systems, adding one additional circuit to the power calculator-calculated number of required circuits may provide line power system availability from mid "six 9s" (0.9999995) at 1 kft and 104 F (with MTTR=5 hours) to high "five 9s" (0.9999963) at 24 kft and 158 F (with MTTR=25 hours). The availability differences are due to temperature and not loop length effects. In systems where the upstream converter is placed in RT, the availability may change in the $7^{th}$ decimal place.

In some systems, adding one additional circuit to the power calculator-determined results and an additional pair per feeder (resulting in two extra circuits per system) may provide availability ranges from mid "six 9s" (0.9999995) at 1 kft and 104 F (with MTTR=5 hours) to high "five 9s" (0.9999963) at 24 kft and 158 F (with MTTR=25 hours). The availability differences are due to temperature and not loop length effects. For systems in which the upstream converter is placed in an RT, the availability changes in the $7^{th}$ decimal place.

Like the method shown in FIG. 4, the sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to a processor, a communication interface, or any other type of non-volatile or volatile memory interfaced or resident to the processor. The memory may include an ordered listing of executable instructions for implementing logical functions. A logical function may be implemented through digital circuitry, through source code, through analog circuitry, or through an analog source such as through an analog electrical audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any logic or software that contains, stores, communicates, propagates, or transports software for use by or in connection with an instruction executable system, apparatus, or device. The machine readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for calculating availability for a line power system, the line power system including at least one power circuit unit interconnecting a first location and a second location, the method comprising:

determining a loop length required for the line power system;

determining a number of first and second location circuits for the line power system;

calculating a number of line power system circuits based on the loop length, the number of first location circuits, and the number of second location circuits;

calculating a total power delivered over the line power system;

calculating a first location circuit availability measure and a second circuit availability measure based on the loop length, the number of first location circuits, the number of second location circuits, the number of line power system circuits, the total power delivered, and at least one parameter representing at least one of a second location, an environmental variable, and a failure or repair statistic associated with the line power system;

calculating a line power system availability measure based on the loop length, the number of first location circuits, the number of second location circuits, the required number of line power system circuits, the total power delivered, and at least one parameter representing second locations or repair time statistics associated with the line power system; and generating a calculated line power system availability plot.

2. The method of claim 1 further comprising:

comparing the line power system availability measure with a predetermined availability metric;

determining a new number of first location circuits required in the line power system, or a new number of second location circuits required for the line power system; and determining a new number of lines per circuits, if the line power system availability measure is less than the predetermined availability metric.

3. The method of claim 2 further comprising recalculating the line power system availability measure based on the new number of first location circuits, a new number of second location circuits required for the line power system, or a new number of lines per circuits.

4. The method of claim 1 wherein determining a loop length, and determining a number of first and second location circuits comprise accessing a database of one or more parameters associated with the loop length, first location circuits, and second location circuits.

5. The method of claim 1 wherein the repair time statistics comprise a mean-time-to-repair distribution associated with the at least one power circuit unit.

6. The method of claim 1 wherein the environmental variables are variables selected from the group consisting of: ambient temperature, ambient humidity, wind velocities, solar exposure factors, latitude, and ground albedo.

7. The method of claim 6 wherein the database comprises a database selected from the group consisting of: an Automated Records and Engineering System (ARES), Loop Facilities Assignment and Control System (LFACS), or Loop Engineering Information System (LEIS) database.

8. The method of claim 1 wherein calculating a number of line power system circuits and calculating a total power delivered comprise utilizing a power calculator.

9. The method of claim 1 wherein the line power system comprises a very high bit rate digital subscriber line system or asymmetric digital subscriber line system.

10. The method of claim 1 wherein the power circuits further comprise:

a first DC-DC power converter;

a second DC-DC power converter; and at least one twisted pair power lines interconnecting the first power converter and the second power converter.

11. The method of claim 1 wherein the failure statistics comprise failure-in-time rates of a first DC-DC converter, the power lines, and the second DC-DC converters.

12. The method of claim 1 wherein the power circuits comprise feeder circuits connecting the first location and the second location.

13. The method of claim 12 wherein the feeder circuits comprise one or more copper line pairs.

* * * * *

UNITED STATES PATENT AND TRADEMARK OFFICE
CERTIFICATE OF CORRECTION

| | | |
|---|---|---|
| PATENT NO. | : 7,627,399 B2 | Page 1 of 1 |
| APPLICATION NO. | : 11/853622 | |
| DATED | : December 1, 2009 | |
| INVENTOR(S) | : Kimble et al. | |

It is certified that error appears in the above-identified patent and that said Letters Patent is hereby corrected as shown below:

Column 1, line 1: insert a section entitled --Related Applications-- including the following:

--This patent issued from a continuation of U.S. Patent Application Serial No. 11/281,119, now U.S. Patent No. 7,286,905, filed on November 16, 2005.--

Signed and Sealed this

Twentieth Day of April, 2010

David J. Kappos
*Director of the United States Patent and Trademark Office*